(12) United States Patent
Goch

(10) Patent No.: US 6,874,207 B2
(45) Date of Patent: Apr. 5, 2005

(54) YOKE FOR AUTOMATIC DEADEND ASSEMBLY

(75) Inventor: Waymon P. Goch, Birmingham, AL (US)

(73) Assignee: Hubbell Incorporated, Orange, CT (US)

(*) Notice: Subject to any disclaimer, the term of this patent is extended or adjusted under 35 U.S.C. 154(b) by 0 days.

(21) Appl. No.: 10/448,460

(22) Filed: May 30, 2003

(65) Prior Publication Data
US 2004/0237265 A1 Dec. 2, 2004

(51) Int. Cl.[7] .............................................. F16G 11/00
(52) U.S. Cl. ............... 24/136 R; 24/115 M; 24/129 R; 403/211; 403/213
(58) Field of Search ................ 24/136 K, 136 R, 24/129 R, 115 M, 136 L; 403/374.1, 213, 403/211, 374.4; 294/102.1

(56) References Cited

U.S. PATENT DOCUMENTS

| | | | |
|---|---|---|---|
| 636,641 A | * 11/1899 | Davin ...................... 24/136 R |
| 749,896 A | 1/1904 | Brown | |
| 1,401,494 A | 12/1921 | Rhorer et al. | |
| 1,628,235 A | * 5/1927 | De Meo ...................... 403/209 |
| 1,832,138 A | 11/1931 | Pounder | |
| 2,255,961 A | * 9/1941 | Becker ...................... 403/213 |
| 2,386,908 A | * 10/1945 | Puckett ...................... 24/136 R |
| 3,220,677 A | * 11/1965 | Sweeney ...................... 248/49 |
| 3,253,308 A | * 5/1966 | Jost ............................ 403/213 |
| 3,775,811 A | 12/1973 | Smrekar et al. | |
| 4,671,695 A | 6/1987 | Scotti | |
| 4,770,491 A | 9/1988 | Champa et al. | |
| 4,872,626 A | 10/1989 | Lienart | |
| 5,015,023 A | 5/1991 | Hall | |
| 5,369,849 A | 12/1994 | De France | |
| 5,539,961 A | * 7/1996 | DeFrance ................. 24/136 R |
| 6,173,103 B1 | 1/2001 | DeFrance | |

\* cited by examiner

Primary Examiner—Robert J. Sandy
(74) Attorney, Agent, or Firm—Marcus R. Mickney; Alfred N. Goodman; Mark S. Bicks

(57) ABSTRACT

A deadend assembly for anchoring a wire to a support includes a yoke having a base. An opening through the base of the yoke receives a wire receiving device and a first bail. First and second opposing hooks on the base receive a second bail. The second bail is removable to facilitate installation of additional deadend assemblies.

29 Claims, 4 Drawing Sheets

YOKE FOR AUTOMATIC DEADEND ASSEMBLY

FIELD OF THE INVENTION

The present invention relates to a yoke for an automatic deadend assembly for anchoring a wire or cable to a support. More particularly, the present invention relates to a universal yoke receiving a first bail to anchor the deadend assembly and a second bail to facilitate installation of the deadend assembly. Still more particularly, the present invention relates to a method of installing a deadend assembly using a first bail to anchor the deadend assembly to a support and a second bail to facilitate installation of the deadend assembly.

BACKGROUND OF THE INVENTION

Terminated ends of wires, cables and the like often need to be securely fixed or anchored to a support. Securing the terminated wires to the support is particularly important for guy wires used to anchor and support large structures, such as towers and antenna masts. Deadend assemblies grip the terminated end of the wire and anchor the wire to the support. Automatic gripping units are often used with deadend assemblies because they automatically grip the end of the cable without requiring additional adjustments, such as tightening of screws or bolts, to provide a quick and efficient device for receiving the end of the wire.

Existing deadend assemblies require special pulling hooks that must be attached to the yoke of the deadend assembly. Once attached, the pulling hooks are used to adjust the tension of the wire received by the deadend assembly. One problem associated with requiring a special pulling hook is that if the installer loses, misplaces or damages the pulling hook, the deadend assembly installation cannot be completed. A need exists for a deadend assembly that does not require a separate and special installation tool.

Furthermore, requiring the special pulling hook to install the deadend assembly increases the number of different parts required to install the deadend assembly, thereby driving up manufacturing costs and installation time. A need exists for a deadend assembly that requires fewer parts for installation.

A need exists for improved deadend assemblies for terminating and anchoring wires and the like.

SUMMARY OF THE INVENTION

Accordingly, it is a primary objective of the present invention to provide an improved deadend assembly for terminating and securing wires and the like.

A further objective of the present invention is to provide an improved deadend assembly for anchoring a guy wire to a support.

A further objective of the present invention is to provide a deadend assembly that does not require a special and separate tool to complete installation of the deadend assembly, thereby increasing the ease and efficiency of installation and reducing the number of parts and manufacturing costs.

A further objective of the present invention is to provide a yoke for a deadend assembly that receives a first bail to connect to a support and receives a second substantially identical bail to connect the yoke to a wire receiving device.

A still further objective of the present invention is to provide a universal yoke that is symmetrical so that it cannot be installed improperly.

The foregoing objects are basically attained by providing a yoke for a deadend assembly. The yoke has a base. An opening through the base receives a wire receiving device and an anchor bail. First and second opposing hooks on the base receive an installation bail.

The foregoing objects are also obtained by providing a deadend assembly. A yoke has an opening therethrough and has an upper and a lower surface. A first bail is received by the opening and anchors the deadend assembly to a support. The first bail enters the yoke from a first surface. A wire receiving device is received by the opening in the yoke. First and second opposing hooks on the base receive a second bail to facilitate installation of the deadend assembly. The second bail enters the yoke from the opposite surface.

The second bail may be substantially identical to the first bail so that a separate installation tool is not required to facilitate installation of the deadend assembly and tensioning of the received wire. Thus, fewer parts are required, which results in reduced inventory and a less expensive deadend assembly for terminating and securing wires and the like.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings that form a part of the original disclosure.

DETAILED DESCRIPTION OF THE INVENTION

Figure 1:
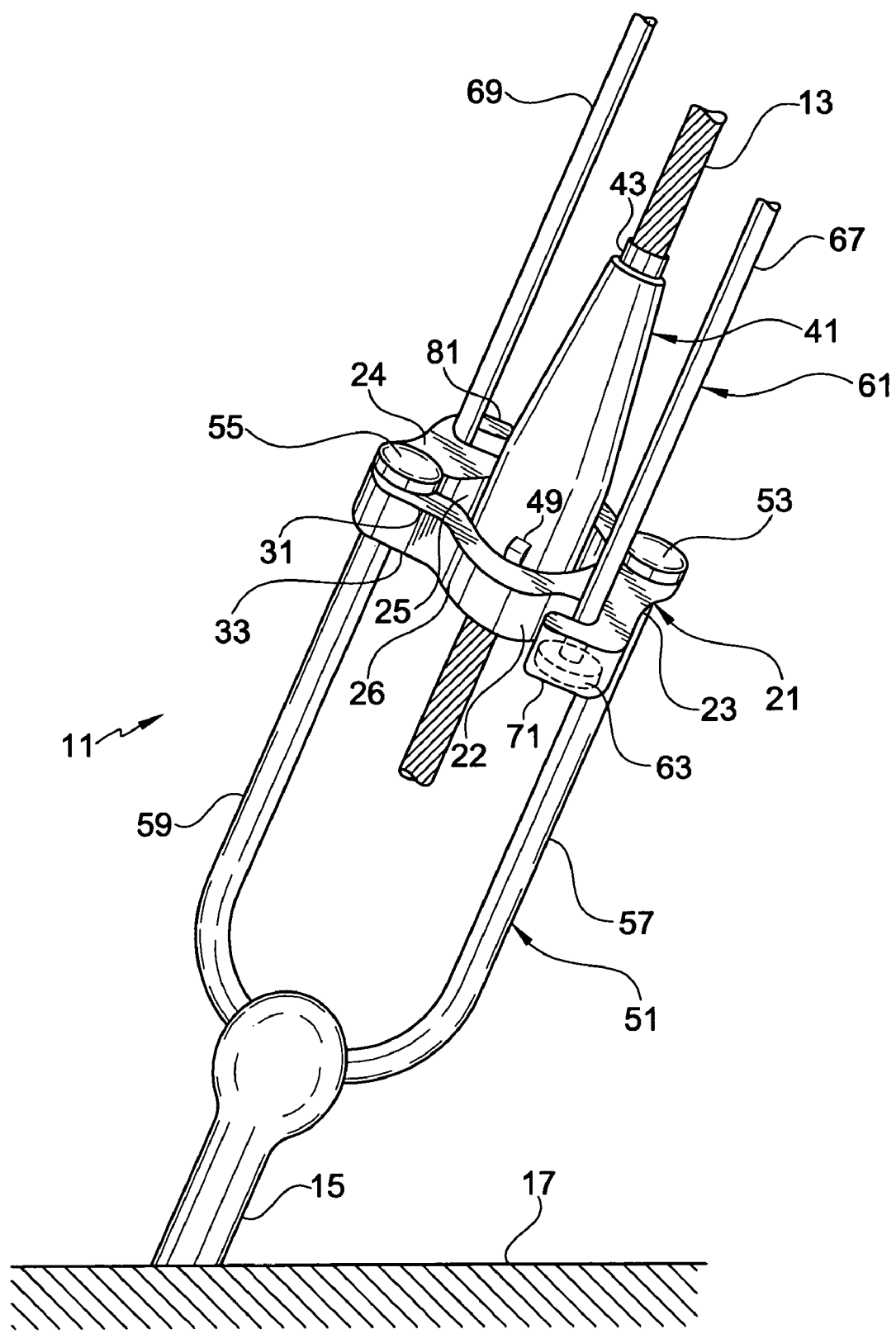
FIG. 1 is a perspective view of a deadend assembly secured to a support prior to removal of a second bail according to the present invention.

As shown in FIGS. 1–9, the present invention relates to a deadend assembly 11 for terminating a wire 13 or the like and anchoring the wire to a support 15, such as an anchor securely embedded in the ground 17. The deadend assembly 11 has a yoke 21 that has a base 23 and an opening 25. The opening 25 through the base 23 receives a wire receiving device 41 and an anchor or first bail 51. First and second opposing hooks 71 and 81 on the base 23 receive an installation, or second, bail 61.

Figure 2:
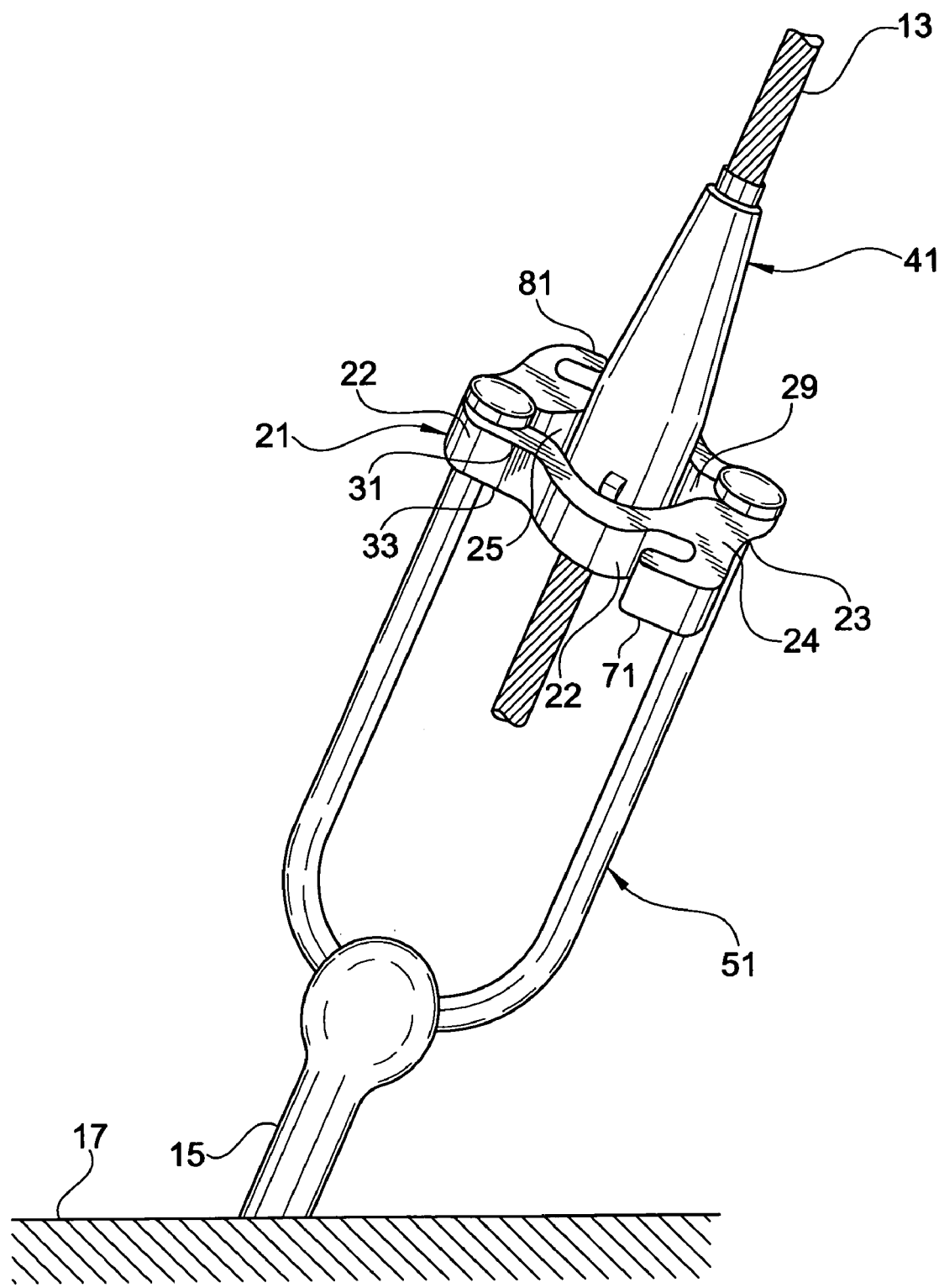
FIG. 2 is a perspective view of the deadend assembly of FIG. 1 after removal of the second bail.
Figure 3:
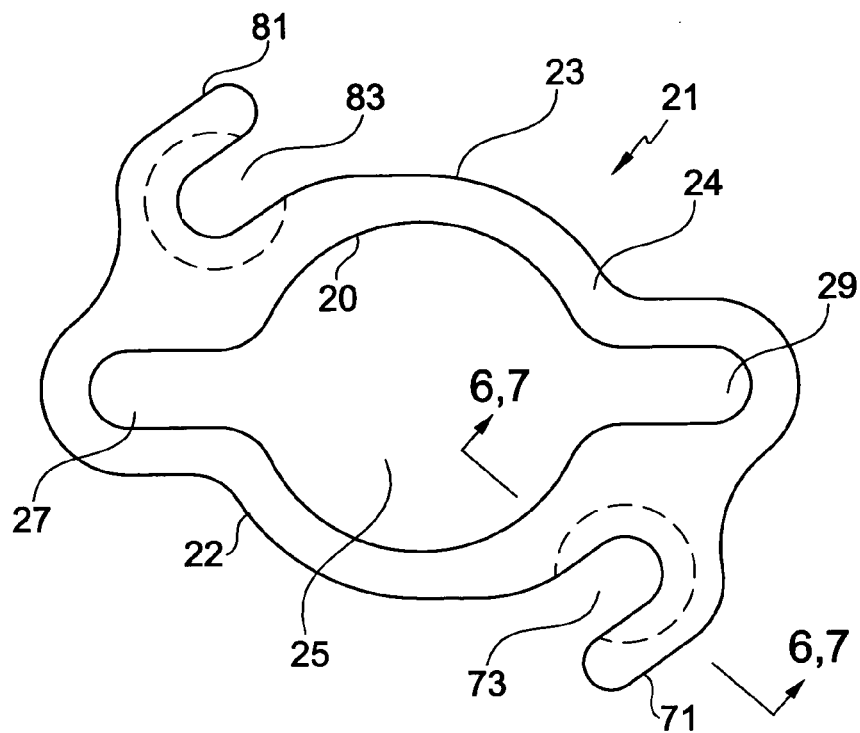
FIG. 3 is a top plan view of a yoke of FIG. 1.

A deadend assembly 11, according to the present invention, includes a yoke 21 having a base 23 and an opening 25 through the base, as shown in FIGS. 1–3. The yoke 21 has an upper surface 24 and a lower surface 26 having outer edges 31 and 33, respectively. Slots 27 and 29 extend outwardly from the opening 25, as shown in FIG. 3. Preferably, the slots 27 and 29 are opposite one another. The opening 25 and slots 27 and 29 define an inner surface 20. The base 23 has an outer surface 22, as shown in FIGS. 1 and 2, that connects outer edge 31 of the upper surface 24 and outer edge 33 of lower surface 26.

Figure 4:
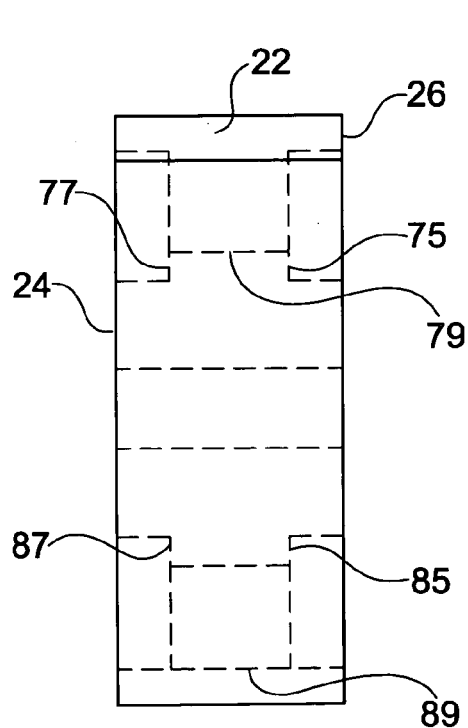
FIG. 4 is a side elevational view of a yoke according to a first embodiment of the present invention.
Figure 6:
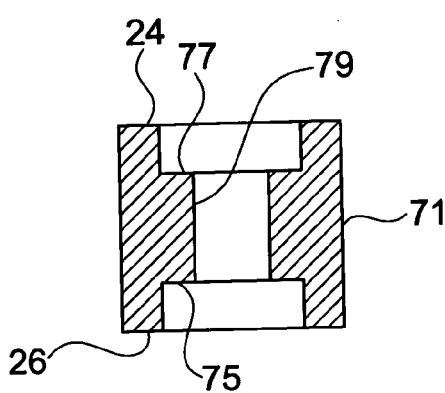
FIG. 6 is a side elevational view of a hook in cross section along line 6—6 of FIG. 3 corresponding to the first embodiment of FIG. 4.

First and second hooks 71 and 81 extend from the outer surface 22 of the base 23 of the yoke 21, as shown in FIGS. 1–3. First and second hooks 71 and 81 define first and second open areas 73 and 83, respectively, for receiving ends of the second bail 61, as shown in FIGS. 1 and 3. In a first embodiment of the present invention, first hook 71 has first and second shoulders 75 and 77 and second hook 81 has first and second shoulders 85 and 87, as shown in FIGS. 4 and 6. Each end of first and second bores 79 and 89 have shoulders at their respective ends for receiving ends of the second bail. By having first and second shoulders for each hook, either the upper or the lower surface of the yoke 21 may be facing upwardly during installation without preventing the hooks from receiving the second bail since there are shoulders at both ends of the bores to provide access from either the upper surface 24 or the lower surface 26 of the yoke. A symmetrical yoke is provided that is impossible to install incorrectly, thereby increasing the efficiency and ease of installation of the deadend assembly.

Figure 5:
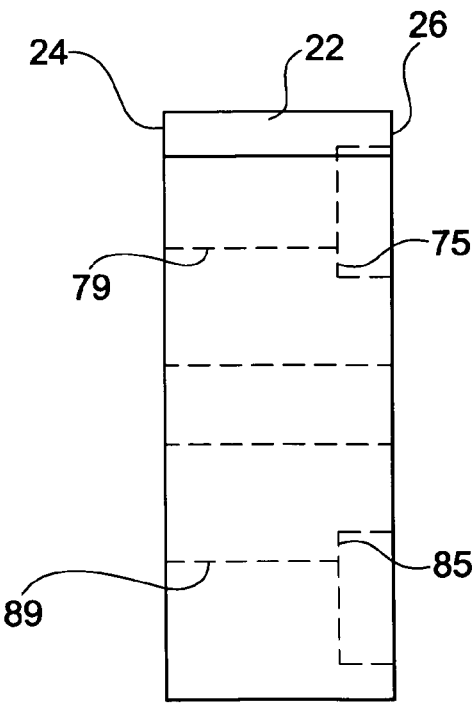
FIG. 5 is a side elevational view of a yoke according to a second embodiment of the present invention.
Figure 7:
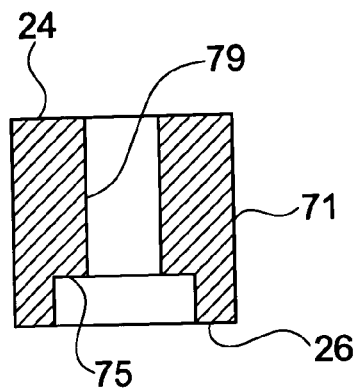
FIG. 7 is a side elevational view of a hook in cross section along line 7—7 of FIG. 3 corresponding to the second embodiment of FIG. 5.
Figure 8:
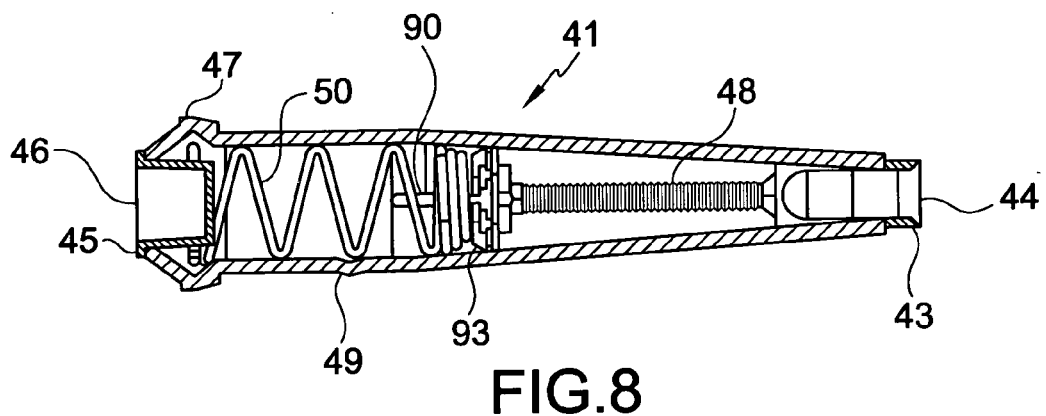
FIG. 8 is a side elevational view of the wire receiving device of FIG. 1.
Figure 9:
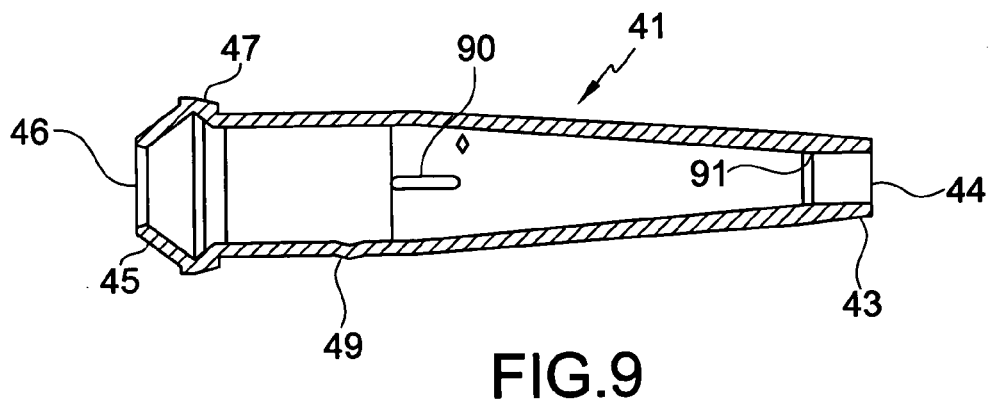
FIG. 9 is a side elevational view in cross section along the longitudinal axis of the wire receiving device of FIG. 8.

In a second embodiment of the present invention, as shown in FIGS. 5 and 7, first and second hooks 71 and 81 have only a first shoulder 75. Only the ends of the bores 79 and 89 proximal the lower surface 26 of the yoke 21 have a shoulder for receiving ends of the second bail 61. First shoulders 75 prevent further movement of heads 63 and 65 of second bail 61 when attached to the yoke 21. In the second embodiment of the present invention, FIGS. 5 and 7, the yoke 21 must be installed so that the lower surface 26 is not facing upwardly, thereby providing a shoulder to prevent upward movement of the second bail 61. If the yoke of the second embodiment is installed so that the lower surface is facing upwardly, the heads of the second bail 61 would not rest on the shoulders. Therefore the shoulders would not prevent removal of the second bail as intended and the yoke must be reinstalled.

Preferably, the yoke 21, including the opening 25, slots 27 and 29 and hooks 71 and 81, is unitarily formed as a single, continuous piece of material. Preferably, the yoke is made of a metal, such as, but not limited to, aluminum.

First bail 51 is substantially U-shaped and has first and second legs 57 and 59, respectively. First leg 57 terminates in a first head 53 and second leg 59 terminates in second head 55. First and second heads 53 and 55 have substantially planar surfaces extending substantially perpendicularly to the first and second legs 57 and 59. Preferably, the first bail 51 is made of a metal, such as, but not limited to, stainless steel.

Second bail 61 is substantially identical to first bail 51 so that first and second bails are interchangeable. First leg 67 terminates in a first head 63 and second leg 69 terminates in a second head (not shown). The second bail is substantially U-shaped, as shown in FIG. 1.

The wire receiving device 41, or gripping unit, as shown in FIGS. 1, 2, 8 and 9, receives the wire 13 to be anchored. The wire receiving device 41 has a first opening 44 at a first end 43 and a second opening 46 at a second end 45. The wiring device 41 is inserted through the opening 25 in the yoke 21 from the lower surface 26. Rim 47 proximal the second end 45 stops the wiring receiving device 41 from being inserted completely through the yoke by abutting the lower surface 26 of the yoke. Tab 49 on the outer surface 42 of the wire receiving device 41 releasably prevents the wire receiving device from being pulled back through the opening 25 in the yoke 21. The wire receiving device, when inserted in the yoke, prevents removal of the first hard legs from the yoke slots.

The wire 13 enters the first opening 44 of the wire receiving device 41 and exits through the second opening 46. Jaws 48 inside the wire receiving device 41 automatically grip the wire 13 and facilitate retention of the wire by the wire receiving device. Spring 50 is adjustable to adjust tension of the received wire 13. Release slot 90 in the wire receiving device allows the jaws 48 to be released and repositioned during installation. Indents 91 proximal the first end 43 of the wire receiving device 41 prevent closure of the jaws 48 to facilitate insertion of the wire through the wire receiving device. Preferably, the wire receiving device 41 is made of a metal, such as, but not limited to, stainless steel.

Assembly and Disassembly

A fully assembled deadend assembly 11 is shown in FIGS. 1 and 2. The following description is for assembly and installation of a deadend assembly that anchors a guy wire to the ground, although the present invention is not limited to such use.

First leg 57 of the first bail 51 is inserted through an opening in a support 15 that is connected to the ground 17. First and second legs 57 and 59 of the first bail 51 are then compressed and inserted through the opening 25 in the yoke 21. For the yoke 21 of the first embodiment, the legs of the first bail 51 may be inserted through the opening of the yoke from either the upper or lower surface since the yoke is symmetrical. For the yoke of the second embodiment, the legs of the first bail 51 must be inserted through the opening 25 in the yoke 21 from the lower surface 26 so that the ends if the second bail 61 may be retained by the shoulders 75 and 85 of the hooks 71 and 81. If the first bail 51 is inserted through the opening 25 of the yoke 21 of the second embodiment from the upper surface 24, then the first bail must be removed from the yoke and the yoke reoriented so that the first bail enters the opening from the lower surface 26 of the yoke. Once the heads 53 and 55 of the first bail 51 have passed through the opening 25, the legs 57 and 59 are released so that they expand into the slots 27 and 29 of the opening. The first bail 51 is positioned so that the heads 53 and 55 abut the upper surface 24 of the yoke 21.

The first end 43 of the wire receiving device 41 is then inserted through the opening 25 in the yoke 21 from the lower surface 26 until the rim 47 abuts the lower surface and stops further movement of the wire receiving device. Tabs 49 on the wire receiving device 41 are positioned above the upper surface 24 of the yoke 21, thereby preventing the wire receiving device from being pulled back through the yoke and facilitating positioning of the wire receiving device in the yoke. The wire receiving device 41 must be attached to the yoke 21 after connecting the first bail 51 to the yoke. Once the first bail 51 has been connected to the yoke 21, the wire receiving device 41 is inserted through the yoke opening 25 by aligning the tabs (dimples) 49 of the wire receiving device with the slots 27 and 29 of the yoke. After the dimples of the wire receiving device have passed through the slots 27 and 29 of the yoke, the wire receiving device is rotated approximately 90 degrees so that the tabs 49 are no longer aligned with the slots of the yoke, thereby preventing removal of the wire receiving device from the yoke.

The second bail 61 is then connected to the yoke 21. The heads 63 of the second bail 61 are positioned so that they abut the shoulders of the hooks 71 and 81 proximal the lower surface 26 of the yoke 21. Pulling upwardly on the second bail 61 results in corresponding upward movement of the yoke 21. The shoulders prevent the heads of the second bail from being pulled through the yoke 21.

The wire 13 is then connected to the wire receiving device 41 of the deadend assembly 11. The wire 13 is inserted through the first opening 44 in the first end 43 of the wire receiving device and pushed through until the wire exits through the second opening 46 in the second end 45. The jaws 48 of the wire receiving device 41 automatically grip and retain the wire within the wire receiving device. Slots 90 in the wire receiving device 41 allow the jaws 48 of the wire receiving device to be released and repositioned during installation. Once the wire 13 has been secured within the wire receiving device 41, the second bail 61 is pulled upwardly, which results in corresponding upward movement of the yoke 21 and wire receiving device 41. While the wire receiving device 41 moves upwardly, the jaws 48 are fixed on the wire and do not move relative to the wire receiving device, thereby compressing the spring 50 and increasing tension of the guy wire. Once the desired tension has been obtained, the second bail 61 is removed from the yoke 21. The second bail 61 may then be used as a second bail on a subsequent deadend assembly 11 installation. Alternatively, since the first and second bails are substantially identical, the second bail 61 may be used as the first bail on a subsequent deadend assembly 11 installation.

While an advantageous embodiment has been chosen to illustrate the invention, it will be understood by those skilled in the art that various changes and modifications may be made therein without departing from the scope of the invention as defined in the appended claims.

What is claimed is:

1. A yoke for a deadend assembly, comprising:
   a base;
   an opening through said base receiving a wire receiving device and an anchor bail, said anchor bail extending completely through said base; and
   first and second opposing hooks on said base for removably receiving an installation bail.

2. A yoke for a deadend assembly according to claim 1, wherein
   first and second opposing slots extend from said opening for receiving the anchor bail.

3. A yoke for a deadend assembly according to claim 1, wherein
   said base is unitarily formed.

4. A yoke for a deadend assembly according to claim 1, wherein
   each of said first and second hooks has a shoulder for retaining ends of the installation bail.

5. A yoke for a deadend assembly according to claim 1, wherein
   each of said first and second hooks has a pair of shoulders for releasably retaining ends of the installation bail.

6. A yoke for a deadend assembly according to claim 1, wherein
   first and second hooks extend from an outer edge of said base.

7. A yoke for a deadend assembly according to claim 1, wherein
   said base is made of metal.

8. A yoke for a deadend assembly according to claim 1, wherein
   said base is made of aluminum.

9. A yoke for a deadend assembly according to claim 1, wherein
   said anchor and installation bails are substantially identical.

10. A yoke for a deadend assembly according to claim 1, wherein
    said anchor and installation bails have enlarged ends and engage opposite surfaces of said base.

11. A yoke for a deadend assembly according to claim 1, wherein
    said anchor and installation bails extend from said base in opposite directions.

12. A yoke for a deadend assembly according to claim 1, wherein
    said opening has a main central portion receiving said wire receiving device and lateral extensions extending from said central portion receiving said anchor bail.

13. A yoke for a deadend assembly according to claim 12, wherein
    said lateral extensions are diametrically opposed.

14. A deadend assembly, comprising:
    a yoke having an opening therethrough, said yoke having a first surface and a second surface;
    a first bail received by said opening to anchor said deadend assembly to a support, said first bail entering said yoke from said second surface;
    a wire receiving device received by said opening in said yoke;
    first and second opposing hooks on said base; and
    a second bail releasably received by said first and second opposing hooks to facilitate installation of said deadend assembly, said second bail entering said yoke from said first surface.

15. A deadend assembly according to claim 14, wherein first and second opposing slots extend from said opening for receiving the first bail.

16. A deadend assembly according to claim 15, wherein dimples on said wire receiving device are aligned with said first and second opposing slots to insert said wire receiving device in said yoke, said wire receiving device being rotated upon insertion so that said dimples are not aligned with said first and second opposing slots to prevent removal of said wire receiving device from said yoke.

17. A deadend assembly according to claim 14, wherein said yoke is unitarily formed.

18. A deadend assembly according to claim 14, wherein each of said first and second hooks has a shoulder for retaining ends of the second bail.

19. A yoke for a deadend assembly according to claim 14, wherein
    each of said first and second hooks has first and second shoulders for retaining ends of the second bail.

20. A deadend assembly according to claim 14, wherein first and second hooks extend from an outer edge of said yoke.

21. A deadend assembly according to claim 14, wherein said yoke is made of metal.

22. A deadend assembly according to claim 14, wherein said yoke is made of aluminum.

23. A deadend assembly according to claim 14, wherein said first and second bails are substantially identical.

24. A method of installing a deadend assembly, comprising the steps of:
- connecting a first bail to a support;
- inserting the first bail through an opening in a yoke from a lower surface of the yoke to connect the first bail to the yoke;
- connecting a wire receiving device to the yoke from an upper surface of the yoke;
- connecting a second bail to the yoke from the upper surface of the yoke;
- connecting a wire to the wire receiving device;
- pulling on the second bail in a direction away from the upper surface of the yoke to increase tension on the wire.

25. A method of installing a deadend assembly according to claim 24, further comprising
- removing the second bail from the yoke.

26. A method of installing a deadend assembly according to claim 24, wherein
- connecting the second bail to the yoke comprises rotating the second bail into hooks on the yoke.

27. A method of installing a deadend assembly according to claim 24, wherein
- inserting the first bail through an opening in the yoke comprises compressing ends of the first bail to pass the first bail through the opening; and releasing the ends of the first bail to expand the ends of the first bail into slots extending from the opening.

28. A method of installing a deadend assembly according to claim 24, wherein
- inserting a first bail through an opening in a yoke from a lower surface comprises providing a symmetrical yoke so that the first bail is insertable through either an upper or lower surface of the yoke.

29. A method of installing a deadend assembly according to claim 24, wherein
- connecting a wire receiving device to the yoke from an upper surface of the yoke comprises aligning tabs on the wire receiving device with slots extending from the yoke opening, inserting the wire receiving device in the yoke opening until the dimples pass through the slots, and rotating the wire receiving device so that the dimples are not aligned with the slots to prevent removal of the wire receiving device from the yoke.

* * * * *